United States Patent
Kato et al.

(10) Patent No.: US 10,473,167 B2
(45) Date of Patent: Nov. 12, 2019

(54) ELECTROMAGNETIC CONNECTING DEVICE

(71) Applicant: OGURA CLUTCH CO., LTD., Gunma (JP)

(72) Inventors: Motoi Kato, Gunma (JP); Yoshihiro Kurosu, Gunma (JP); Yasuyuki Iizuka, Gunma (JP); Shun Tomaru, Gunma (JP)

(73) Assignee: OGURA CLUTCH CO., LTD., Gunma (JP)

( * ) Notice: Subject to any disclaimer, the term of this patent is extended or adjusted under 35 U.S.C. 154(b) by 67 days.

(21) Appl. No.: 15/878,364

(22) Filed: Jan. 23, 2018

(65) Prior Publication Data

US 2018/0209490 A1    Jul. 26, 2018

(30) Foreign Application Priority Data

Jan. 24, 2017 (JP) .................................. 2017-010189

(51) Int. Cl.
  *F16D 27/112* (2006.01)
  *F16D 13/76* (2006.01)
  *F16D 27/00* (2006.01)

(52) U.S. Cl.
  CPC ............ *F16D 27/112* (2013.01); *F16D 13/76* (2013.01); *F16D 2027/005* (2013.01); *F16D 2027/007* (2013.01)

(58) Field of Classification Search
  None
  See application file for complete search history.

(56) References Cited

U.S. PATENT DOCUMENTS

| 4,295,553 A * | 10/1981 | Sayo | ...................... F16D 27/112 192/84.961 |
| 4,627,525 A * | 12/1986 | Geldec | .................. F16D 27/112 192/103 R |
| 2007/0289831 A1 | 12/2007 | Ota et al. | |

FOREIGN PATENT DOCUMENTS

| CN | 2584928 Y | 11/2003 |
| CN | 102454725 A | 5/2012 |

(Continued)

OTHER PUBLICATIONS

Office Action received for Korean Patent Application No. 10-2018-0007271, dated Mar. 19, 2019, 5 pages of Original Document Only.

(Continued)

*Primary Examiner* — Timothy Hannon
(74) *Attorney, Agent, or Firm* — Womble Bond Dickinson (US) LLP (57) ABSTRACT

An electromagnetic clutch includes a field core including a coil storage groove, and a rotor including a core storage groove. The coil storage groove is formed by an inner cylindrical portion, an outer cylindrical portion, and a bottom portion. The bottom portion of the field core wholly projects to the outside of the core storage groove. The outer peripheral surface of the inner cylindrical portion and the inner peripheral surface of the outer cylindrical portion include a first transition surface and a second transition surface, respectively, on the bottom portion side. Each of the first transition surface and the second transition surface includes a tilting surface that gradually narrows the groove width of the coil storage groove along with an increase in a distance from the side of the opening of the coil storage groove.

6 Claims, 7 Drawing Sheets

(56) References Cited

FOREIGN PATENT DOCUMENTS

| | | |
|---|---|---|
| CN | 204025436 U | 12/2014 |
| CN | 104315032 A | 1/2015 |
| CN | 205841563 U | 12/2016 |
| JP | 2009243678 | 10/2009 |
| JP | 2012-117551 A | 6/2012 |
| JP | 2012-122515 A | 6/2012 |
| KR | 10-1983-0002170 A | 5/1983 |

OTHER PUBLICATIONS

Office Action received for Chinese Patent Application No. 201810061594.5, dated Mar. 5, 2019, 9 pages (3 pages of English Translation and 6 pages of Office Action).
"English translation of Korean Office Action," KR Patent Application No. 10-2018-0007271 dated Mar. 19, 2019.
Office Action received for Chinese Patent Application No. 201810061594.5, dated Aug. 30, 2019, 13 pages (8 pages of English Translation and 5 pages of Office Action).

* cited by examiner

RELATED ART

ELECTROMAGNETIC CONNECTING DEVICE

BACKGROUND OF THE INVENTION

The present invention relates to an electromagnetic connecting device including a field core with an annular coil storage groove.

An electromagnetic connecting device includes a rotor that receives power transmitted from a driving source such as an engine or a motor and rotates, an armature facing the friction surface of the rotor across an air gap, a field core inserted into the core storage groove of the rotor, an electromagnetic coil stored in the coil storage groove of the field core, and the like.

Among electromagnetic connecting devices of this type, there is an electromagnetic clutch that switches between transmission and cutoff of power to a compressor for a car air conditioner. The electromagnetic clutch is mounted on the front housing side of the compressor. The rotor of the electromagnetic clutch is rotatably supported by the cylindrical nose portion of the front housing via a bearing. The rotating shaft of the compressor is inserted into the axial portion of the nose portion. The armature is supported, via a leaf spring, by an armature hub integrally rotatably key-fitted in an axial end of the rotating shaft. The field core is formed from an inner cylindrical portion, an outer cylindrical portion, and an annular bottom portion that connects ends of these members on one side to each other. In the field core, an annular coil storage groove surrounded by the inner cylindrical portion, the outer cylindrical portion, and the bottom portion is formed. The inner peripheral surface of the inner cylindrical portion and the outer peripheral surface of the outer cylindrical portion are flat cylindrical surfaces formed on the same axis as the center line of the field core.

A large field core is formed by cutting a columnar blank made of a low-carbon steel material for mechanical structure or a material similar to that into an annular member with a U-shaped section. General field cores, including large field cores, are formed by drawing such as hot forging or cold forging, cutting, and the like. That is, a field core is formed as an annular member with a U-shaped section by setting a blank made of a plate material such as a cold rolled steel sheet or a hot rolled steel sheet in a mold of press working (drawing such as hot forging or cold forging), plastically deforming the blank into an almost U-shaped section using a molding press die so as to work it into a semi-finished product, and then performing a step such as cutting.

The electromagnetic coil stored in the field core is generally formed by a copper wire. As a wire used to form the electromagnetic coil, an aluminum wire is sometimes used to reduce the weight and manufacturing cost of the field core, as described in, for example, Japanese Patent Laid-Open No. 2009-243678 (literature 1).

However, the conductivity of the aluminum wire is lower than that of the copper wire. For this reason, when using an aluminum wire, it is necessary to select an aluminum wire whose wire diameter is larger than that of a copper wire and make an ampere-turn AT (an attraction force acting on the armature by the magnetic flux) equal to that of the copper wire. Since the volume of an electromagnetic coil made by winding a thick aluminum wire multiple times increases as compared to a case in which a copper wire is used, the storage space of the coil storage groove to store the electromagnetic coil needs to be made large.

Figure 7:
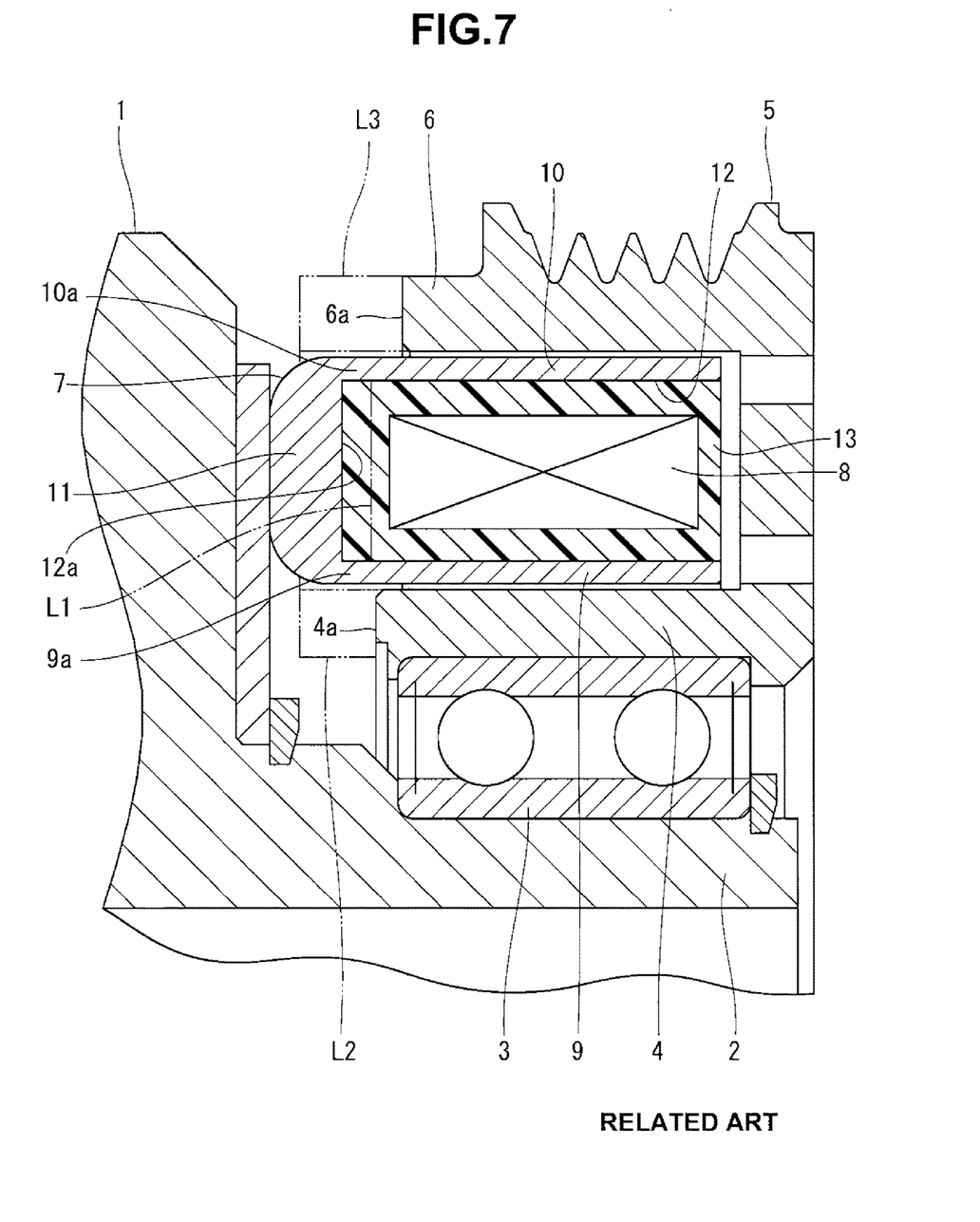
FIG. 7 is an enlarged sectional view showing a part of an electromagnetic connecting device according to a related art.

To implement this, an arrangement as shown in FIG. 7 can be considered. A field core 7 is formed by an inner cylindrical portion 9, an outer cylindrical portion 10, and a bottom portion 11, and includes a coil storage groove 12. An electromagnetic coil 8 is sealed by an insulating resin 13 in a state in which the electromagnetic coil 8 is inserted into the coil storage groove 12. In the field core 7, to make the capacity of the coil storage groove 12 large, the thickness of the bottom portion 11 is made small as compared to a case in which an electromagnetic coil using a copper wire is stored. The bottom surface of the bottom portion 11 in a case in which the electromagnetic coil using the copper wire is stored is indicated by an alternate long and two short dashed line L1 in FIG. 7.

However, when the bottom portion 11 of the field core 7 is formed thin, as shown in FIG. 7, a bottom surface 12a of the coil storage groove 12 is largely apart from end faces 4a and 6a of an inner cylindrical portion 4 and an outer cylindrical portion 6 of a rotor 5 to the side of a front housing 1. In this case, because of the small thickness of the bottom portion 11 of the field core 7, the flux density increases in bases 9a and 10a (ends close to the bottom portion 11) of the inner cylindrical portion 9 and the outer cylindrical portion 10 of the field core 7, and magnetic saturation occurs. That is, the flow of the magnetic flux between the field core 7 and the rotor 5 deteriorates. If such magnetic saturation occurs in the magnetic circuit, a magnetic attraction force for magnetically attracting the armature to the rotor 5 weakens.

Such a problem is solved by forming the inner cylindrical portion 4 and the outer cylindrical portion 6 of the rotor 5 long in the axial direction and reducing the gap between the distal ends of the cylindrical portions of the rotor 5 and the bottom portion 11 of the field core 7, as indicated by alternate long and two short dashed lines L2 and L3 in FIG. 7. However, if the inner cylindrical portion 4 and the outer cylindrical portion 6 of the rotor 5 become long in the axial direction, the weight of the rotor 5 increases. In addition, since the number of manufacturing steps in performing hot forging or the like increases, cost reduction of the electromagnetic clutch becomes difficult. Note that in FIG. 7, reference numeral 2 denotes a nose portion of the front housing 1; and 3, a bearing.

SUMMARY OF THE INVENTION

The present invention has been made to solve the above-described problem, and has as its object to provide an electromagnetic connecting device that improves the magnetic flux permeability between a field core and a rotor without changing the shape of the rotor while employing a structure that ensures a wide coil storage space in the field core.

In order to achieve this object, according to the present invention, there is provided an electromagnetic connecting device comprising an electromagnetic coil, a field core including a first inner cylinder, a first outer cylinder, a bottom that connects an edge of the first inner cylinder and an edge of the first outer cylinder, and a coil storage groove that stores the electromagnetic coil, a rotor including a second inner cylinder, a second outer cylinder, a disc that connects an edge of the second inner cylinder and an edge of the second outer cylinder, and a core storage groove that stores the field core inserted from a side of an opening of the coil storage groove, and an armature facing the disc of the rotor, wherein the bottom of the field core wholly projects to an outside of the core storage groove, an outer peripheral surface of the first inner cylinder and an inner peripheral surface of the first outer cylinder include a first transition surface and a second transition surface, respectively, on a side of the bottom, and each of the first transition surface and the second transition surface includes a tilting surface that gradually narrows a groove width of the coil storage groove along with an increase in a distance from the side of the opening of the coil storage groove.

DESCRIPTION OF THE PREFERRED EMBODIMENTS

First Embodiment

An electromagnetic connecting device according to an embodiment of the present invention will now be described in detail with reference to FIGS. 1 and 2. In this embodiment, an example in which the present invention is applied to an electromagnetic clutch will be described.

Figure 1:
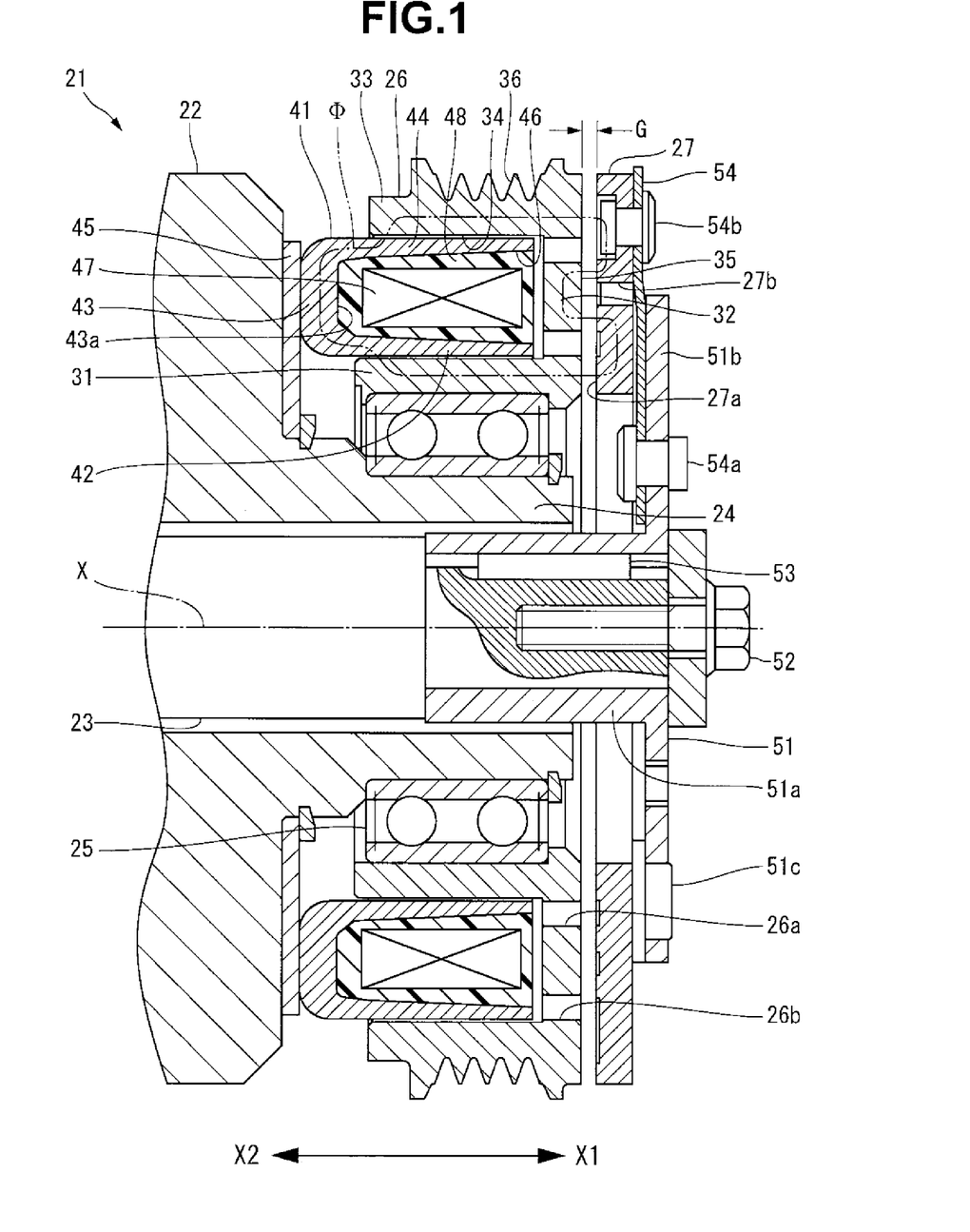
FIG. 1 is a sectional view of an electromagnetic connecting device according to the first embodiment of the present invention.

An electromagnetic clutch 21 shown in FIG. 1 is mounted on a housing 22 of a compressor for a car air conditioner located on the left side in FIG. 1, and switches between a state in which power is transmitted from an engine or motor (not shown) to a rotating shaft 23 of the compressor for the car air conditioner and a state in which the power transmission is cut off.

The electromagnetic clutch 21 includes a rotor 26 rotatably supported by a cylindrical nose portion 24 of the housing 22 via a bearing 25, and an armature 27 adjacent to the rotor 26. A direction parallel to an axis (center line) X of the rotating shaft 23 will be defined as an "axial direction" hereinafter. In addition, a direction (rightward in FIG. 1) in which the nose portion 24 projects from the front housing 22 will be defined as a positive axial direction X1, and a direction opposite to the direction X1 will be defined as a negative axial direction X2.

The rotor 26 includes an inner cylindrical portion 31 (second inner cylinder) and an outer cylindrical portion 33 (second outer cylinder) which are located on the same axis as the rotating shaft 23, and a disc portion 32 (disc) that connects an end of the inner cylindrical portion 31 and an end of the outer cylindrical portion 33. The inner cylindrical portion 31 is fitted on the bearing 25. The disc portion 32 extends radially outward from an end of the inner cylindrical portion 31 in the positive axial direction X1. The outer cylindrical portion 33 extends in the negative axial direction X2 from the outer peripheral portion of the disc portion 32. The inner cylindrical portion 31, the disc portion 32, and the outer cylindrical portion 33 form an annular core storage groove 34 that opens in the negative axial direction X2. On the disc portion 32 of the rotor 26, a friction surface 35 that frictionally engages with a friction surface 27a of the armature 27 to be described later is formed. A pulley 36 on which a transmission belt (not shown) is wound is formed on the outer peripheral portion of the outer cylindrical portion 33. Note that reference numerals 26a and 26b denote arc slits formed for magnetic shielding in the disc portion 32 of the rotor 26. In addition, an alternate long and two short dashed line indicated by symbol Φ represents a magnetic circuit of a magnetic flux.

The core storage groove 34 stores a field core 41. The field core 41 includes an inner cylindrical portion 42 (first inner cylinder) and an outer cylindrical portion 44 (first outer cylinder) which are located on the same axis as the rotating shaft 23, and a disc-shaped bottom portion 43 (bottom) that connects an end of the inner cylindrical portion 42 and an end of the outer cylindrical portion 44. The inner cylindrical portion 42 extends in the negative axial direction X2. The bottom portion 43 extends radially outward from an end of the inner cylindrical portion 42 in the negative axial direction X2. The outer cylindrical portion 44 extends in the positive axial direction X1 from the outer peripheral portion of the bottom portion 43. An adapter plate 45 is welded to the bottom portion 43 of the field core 41. The field core 41 is supported by the housing 22 via the adapter plate 45.

The inner cylindrical portion 42, the bottom portion 43, and the outer cylindrical portion 44 of the field core 41 form an annular coil storage groove 46 that opens in the positive axial direction X1. An outer peripheral surface 42a of the inner cylindrical portion 42 and an inner peripheral surface 44a of the outer cylindrical portion 44 include a first transition surface (56) and a second transition surface (58), respectively, on the side of the bottom portion 43. Each of the first transition surface (56) and the second transition surface (58) includes a tilting surface that gradually narrows the groove width of the coil storage groove 46 along with an increase in the distance from the side of the opening of the coil storage groove 46, that is, in the negative axial direction X2. The coil storage groove 46 stores an annular electromagnetic coil 47 and sealed by an insulating resin 48. The electromagnetic coil 47 is formed using an aluminum wire, although not illustrated in detail.

The rotating shaft 23 projects from the nose portion 24 in the positive axial direction X1. A boss portion 51a of an armature hub 51 is fixed to the distal end of the rotating shaft 23 by a fixing bolt 52 in a state in which the boss portion 51a is fitted on the distal end. The rotation of the boss portion 51a with respect to the rotating shaft 23 is regulated by a key 53. The boss portion 51a rotates integrally with the rotating shaft 23.

The armature hub 51 includes the above-described boss portion 51a, and a flange portion 51b extending radially outward from the boss portion 51a. The armature 27 is attached to the flange portion 51b via a leaf spring 54 extending in the radial direction of the boss portion 51a. A proximal end of the leaf spring 54 on the inner side in the radial direction is fixed to the flange portion 51b by a first rivet 54a. A free end of the leaf spring 54 on the outer side in the radial direction is fixed to the outer peripheral portion of the armature 27 by a second rivet 54b.

The armature 27 faces the disc portion 32 of the rotor 26 and is held at a position apart by an air gap G from the disc portion 32 of the rotor 26 in the positive axial direction X1. In an excited state in which the electromagnetic coil 47 is energized, the friction surface 27a of the armature 27 is attracted by a magnetic force to the friction surface 35 of the rotor 26 against the spring force of the leaf spring 54. Note that reference numeral 27b denotes an arc slit for magnetic shielding. Reference numeral 51c denotes a stopper rubber fixed to the flange portion 51b of the armature hub 51.

In the field core 41, the capacity of the coil storage groove 46 is increased so as to store the electromagnetic coil 47 made of an aluminum wire, as compared to a case in which an electromagnetic coil made of a copper wire is stored. More specifically, in the field core 41 according to this embodiment, the thickness of the bottom portion 43 is designed to be small as compared to a case in which an electromagnetic coil made of a copper wire is used. For this reason, when the field core 41 is inserted into the core storage groove 34 of the rotor 26 from the side of the opening of the coil storage groove 46, the whole bottom portion 43 of the field core 41 projects to the outside of the core storage groove 34. That is, a bottom surface 43a of the coil storage groove 46 of the field core 41 is located at a position spaced apart in the negative axial direction X2 from an end face 31a of the inner cylindrical portion 31 of the rotor 26 and an end face 33a of the outer cylindrical portion 33.

The field core 41 is formed into a predetermined shape by cold forging because the bottom portion 43 is thin. To do cold forging, a draft angle needs to be provided on each of the outer peripheral surface 42a of the inner cylindrical portion 42 and the inner peripheral surface 44a of the outer cylindrical portion 44 of the field core 41 (see FIG. 2). Hence, each of the outer peripheral surface 42a and the inner peripheral surface 44a is formed as a tilting surface (to be referred to as a tapered surface hereinafter). The tapered surface tilts such that the groove width of the coil storage groove 46 gradually becomes narrow from the side of the opening of the coil storage groove 46 to the bottom portion 43.

Figure 2:
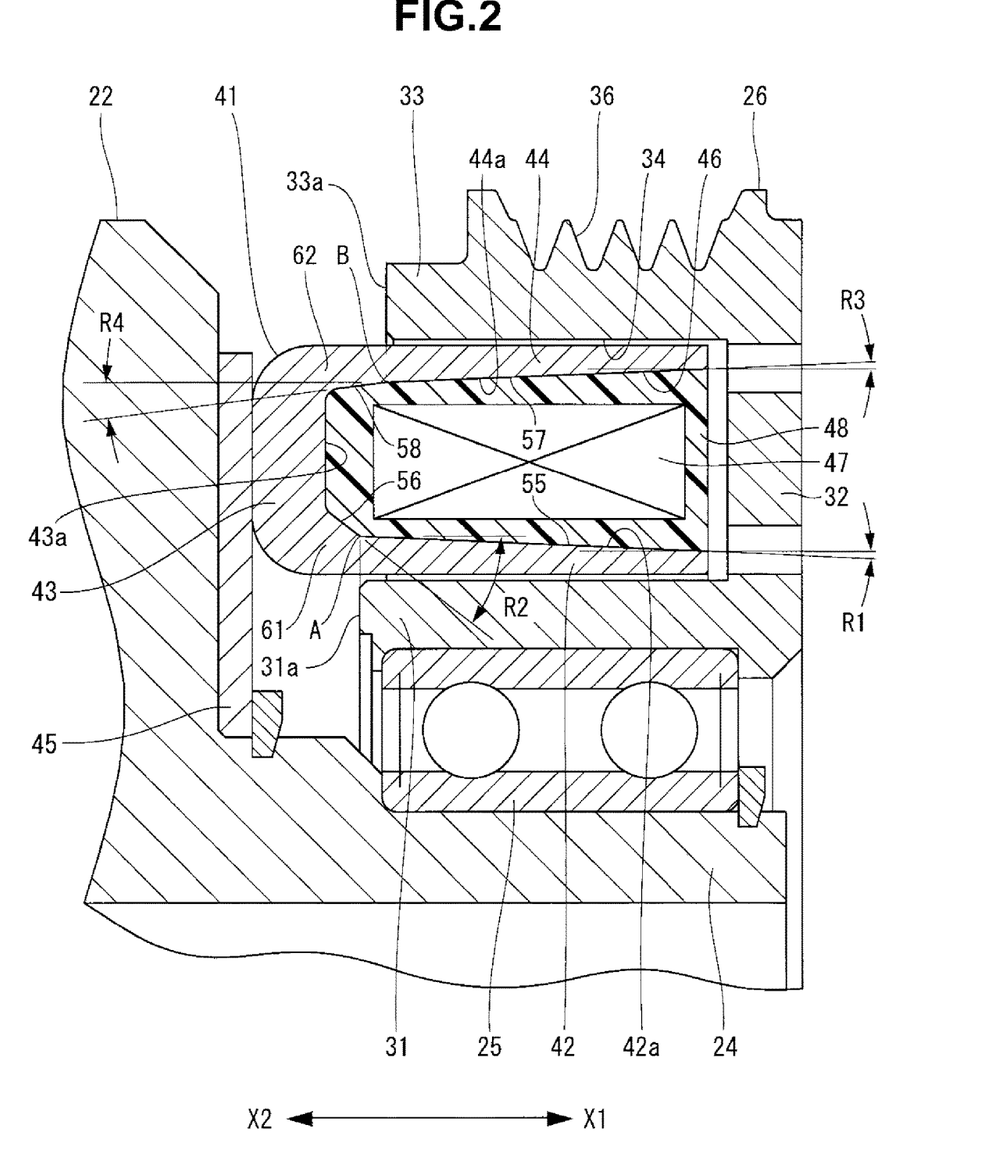
FIG. 2 is an enlarged sectional view showing main parts in FIG. 1.

More specifically, as shown in FIG. 2, the outer peripheral surface 42a of the inner cylindrical portion 42 includes a first tapered surface 55 extending from the opening edge of the coil storage groove 46 toward the bottom portion 43, and a second tapered surface 56 serving as the first transition surface that transitions from the first tapered surface 55 to the bottom surface 43a. The first tapered surface 55 tilts by an angle R1 with respect to the axis X. The angle R1 is the draft angle. The second tapered surface 56 tilts by an angle R2 with respect to the axis X. The angle R2 is larger than the angle R1. A first bending point A serving as the connecting point between the first tapered surface 55 and the second tapered surface 56 is provided at the same position in the axial direction as the end face 31a of the inner cylindrical portion 31 of the rotor 26.

The inner peripheral surface 44a of the outer cylindrical portion 44 includes a third tapered surface 57 extending from the opening edge of the coil storage groove 46 toward the bottom portion 43, and the fourth tapered surface 58 serving as a second transition surface that transitions from the third tapered surface 57 to the bottom surface 43a. The third tapered surface 57 tilts by an angle R3 with respect to the axis X. The angle R3 is the draft angle. The fourth tapered surface 58 tilts by an angle R4 with respect to the axis X. The angle R4 is larger than the angle R3. A second bending point B serving as the connecting point between the third tapered surface 57 and the fourth tapered surface 58 is provided at the same position in the axial direction as the end face 33a of the outer cylindrical portion 33 of the rotor 26.

Since the thus configured field core 41 is provided with the second tapered surface 56 and the fourth tapered surface 58, the magnetic path sectional area increases at a first corner portion 61 that is a portion from the inner cylindrical portion 42 to the bottom portion 43 and a second corner portion 62 that is a portion from the outer cylindrical portion 44 to the bottom portion 43. For this reason, although the bottom surface 43a of the coil storage groove 46 is largely spaced apart from the end face 31a of the inner cylindrical portion 31 of the rotor 26 and the end face 33a of the outer cylindrical portion 33 (the end faces in the negative axial direction X2) to the side of the housing 22 (negative axial direction X2), magnetic saturation in the bases 9a and 10a (see FIG. 7) of the field core is eliminated. It is therefore possible to provide an electromagnetic connecting device that improves the magnetic flux permeability between the field core 41 and the rotor 26 without changing the shape of the rotor 26 while employing a structure that ensures a wide coil storage space in the field core 41.

As shown in this embodiment, when the bottom portion 43 of the field core 41 can be formed into a small thickness, not hot forging but cold forging can be used as the drawing in press for forming the field core 41. According to cold forging, plastic working can be accurately performed as compared to hot forging. For this reason, when performing cutting for finishing of the field core 41, it is economical because the cutting amount of the semi-finished product can be reduced.

In the field core 41 according to this embodiment, the tilting angle R2 of the second tapered surface 56 serving as the first transition surface that transitions from the outer peripheral surface 42a of the inner cylindrical portion 42 to the bottom surface 43a with respect to the axis X is larger than the tilting angle R4 of the fourth tapered surface 58 serving as the second transition surface that transitions from the inner peripheral surface 44a of the outer cylindrical portion 44 to the bottom surface 43a with respect to the axis X. For this reason, the magnetic path sectional area of the first corner portion 61 that is a portion from the inner cylindrical portion 42 to the bottom portion 43 has a value closer to the magnetic path sectional area of the second corner portion 62 that is a portion from the outer cylindrical portion 44 to the bottom portion 43. Since the flux density distribution is uniformed, and the magnetic resistance in the magnetic circuit Φ becomes low, the magnetic flux permeability between the field core 41 and the rotor 26 further rises.

The electromagnetic coil 47 according to this embodiment is made of an aluminum wire. For this reason, since the electromagnetic coil 47 made of the aluminum wire can be stored in the lightweight field core 41, further weight reduction of the electromagnetic connecting device can be implemented, and the electromagnetic connecting device can be provided inexpensively.

Second Embodiment

Figure 3:
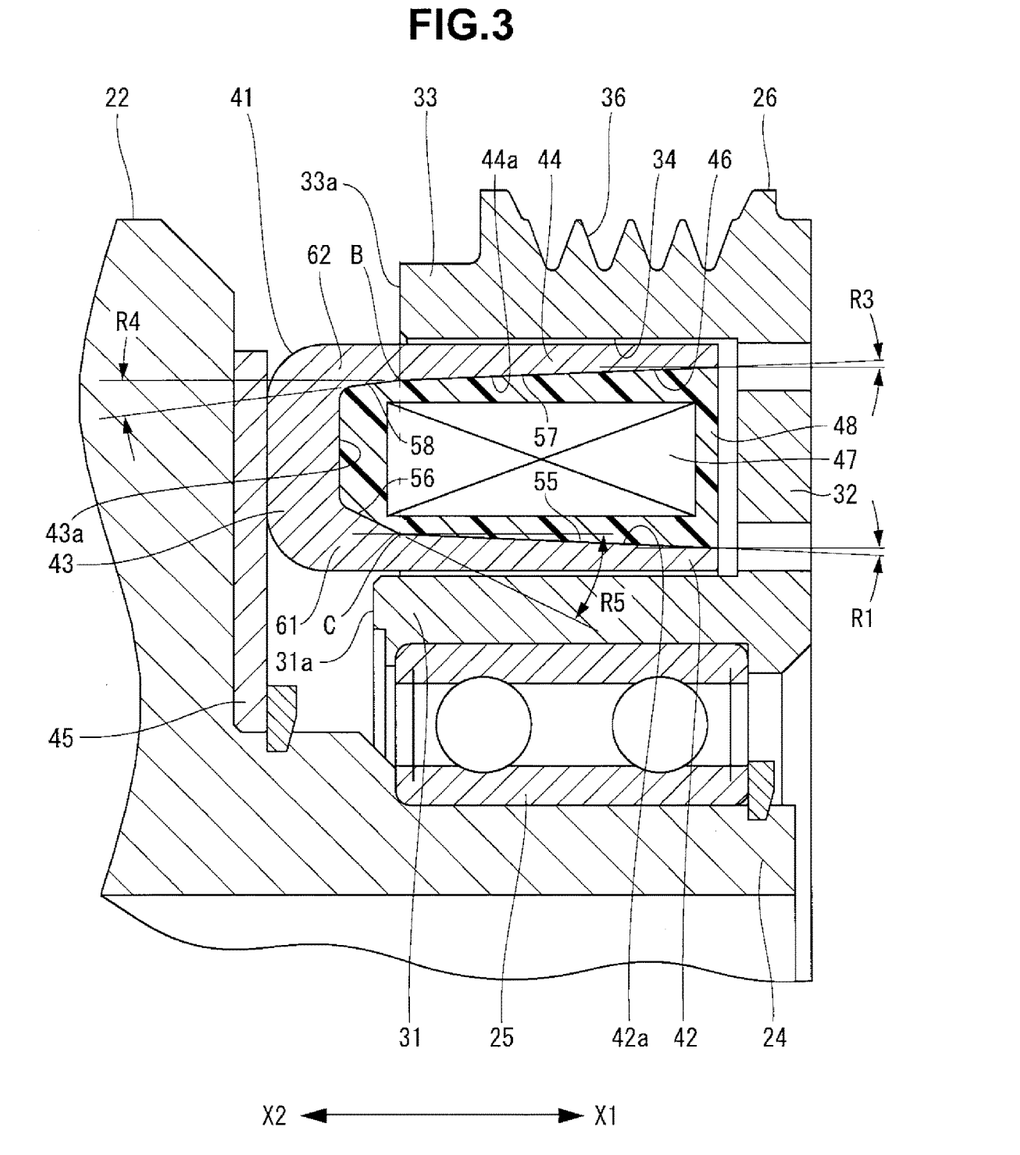
FIG. 3 is a sectional view showing the second embodiment of the present invention.

A second tapered surface 56 of a field core 41 can be formed as shown in FIG. 3. Members that are the same as or similar to those described with reference to FIGS. 1 and 2 are denoted by the same reference numerals in FIG. 3, and a detailed description thereof will appropriately be omitted.

The second tapered surface 56 shown in FIG. 3 tilts by an angle R5 with respect to an axis X. The angle R5 is larger than a tilt angle R4 of a fourth tapered surface 58. A third bending point C that is the connecting point between the second tapered surface 56 and a first tapered surface 55 is provided at the same position in the axial direction as a second bending point B on the side of an outer cylindrical portion 44, that is, an end face 33a of an outer cylindrical portion 33 of a rotor 26. This means that the third bending point C is located at a position spaced apart in a positive axial direction X1 (on the side of the opening of a coil storage groove 46) from an end face 31a of an inner cylindrical portion 31 of the rotor 26.

When the second tapered surface 56 (first transition surface) is formed as shown in this embodiment, magnetic saturation in bases 9a and 10a (see FIG. 7) of the field core is eliminated. In addition, the magnetic path sectional area of a first corner portion 61 that is a portion from an inner cylindrical portion 42 to a bottom portion 43 has a value closer to the magnetic path sectional area of a second corner portion 62 that is a portion from the outer cylindrical portion 44 to the bottom portion 43. Since the flux density distribution is uniformed, and the magnetic resistance in a magnetic circuit Φ becomes low, the magnetic flux permeability between the field core 41 and the rotor 26 further rises.

Third Embodiment

Figure 4:
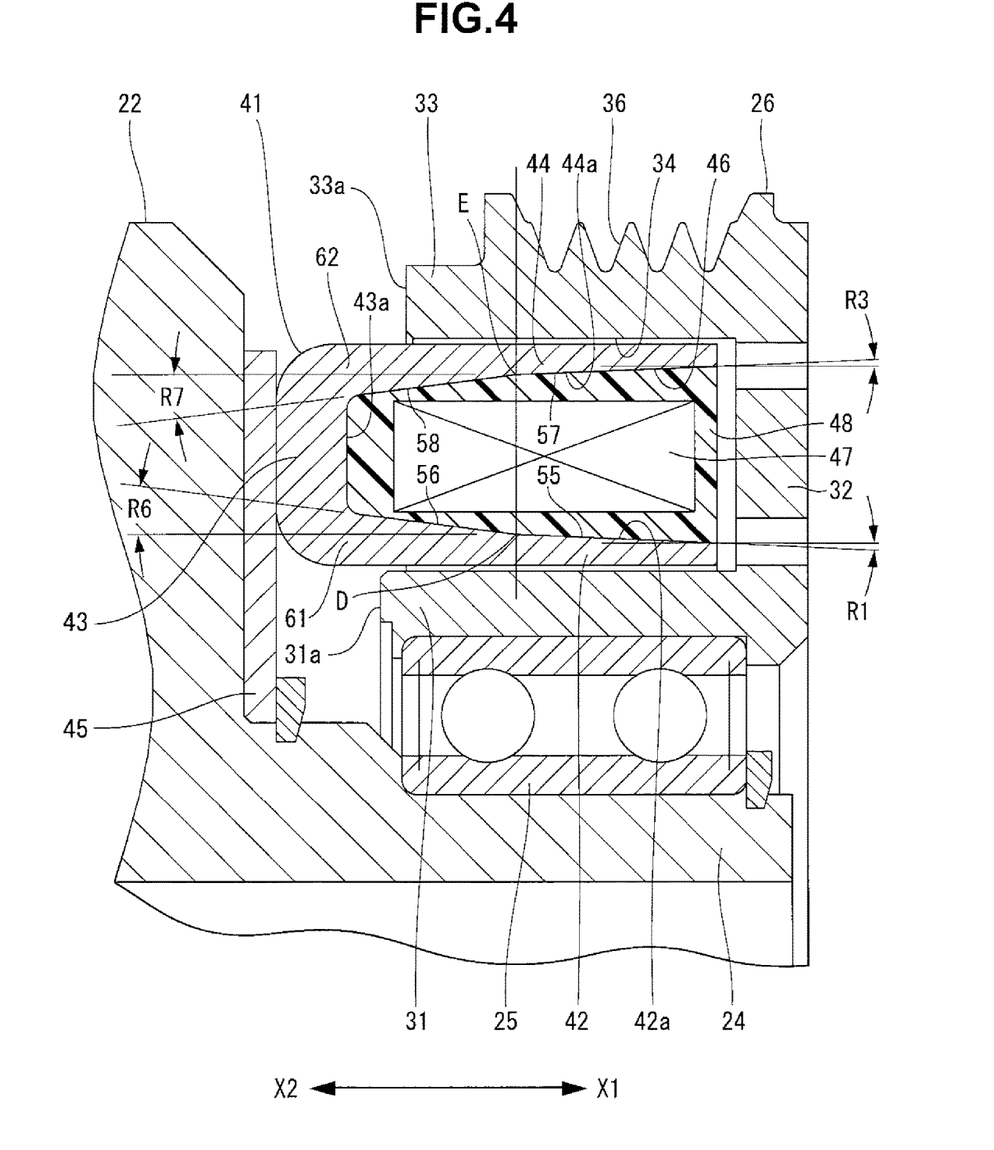
FIG. 4 is a sectional view showing the third embodiment of the present invention.

A second tapered surface 56 and a fourth tapered surface 58 of a field core 41 can be formed as shown in FIG. 4. Members that are the same as or similar to those described with reference to FIGS. 1 and 2 are denoted by the same reference numerals in FIG. 4, and a detailed description thereof will appropriately be omitted.

The second tapered surface 56 shown in FIG. 4 tilts by an angle R6 with respect to an axis X. A fourth bending point D that is the connecting point between the second tapered surface 56 and a first tapered surface 55 is provided at a position overlapping the intermediate portion of an inner cylindrical portion 31 of a rotor 26 in the axial direction. This means that the fourth bending point D is located at a position spaced apart in a positive axial direction X1 (on the side of the opening of a coil storage groove 46) from an end face 31a of an inner cylindrical portion 31 of the rotor 26.

On the other hand, the fourth tapered surface 58 tilts by an angle R7 with respect to the axis X. The angle R7 equals the tilt angle R6 of the second tapered surface 56. A fifth bending point E that is the connecting point between the fourth tapered surface 58 and a third tapered surface 57 is located at the same position as the fourth bending point D in the axial direction. This means that the fifth bending point E is located at a position spaced apart in the positive axial direction X1 (on the side of the opening of the coil storage groove 46) from an end face 33a of an outer cylindrical portion 33 of the rotor 26. The positions of the fourth and fifth bending points D and E are preferably changed in accordance with the inner diameter size and the outer diameter size of an electromagnetic coil 47 made of an aluminum wire wound multiple times.

Even when the second tapered surface 56 and the fourth tapered surface 58 are formed as shown in this embodiment, the magnetic path sectional area of a first corner portion 61 that is a portion from an inner cylindrical portion 42 to a bottom portion 43 and the magnetic path sectional area of a second corner portion 62 that is a portion from an outer cylindrical portion 44 to the bottom portion 43 increase. For this reason, magnetic saturation in bases 9a and 10a (see FIG. 7) of the field core is eliminated, the magnetic resistance in a magnetic circuit Φ becomes low, and the magnetic flux permeability between the field core 41 and the rotor 26 further rises.

Fourth Embodiment

Figure 5:
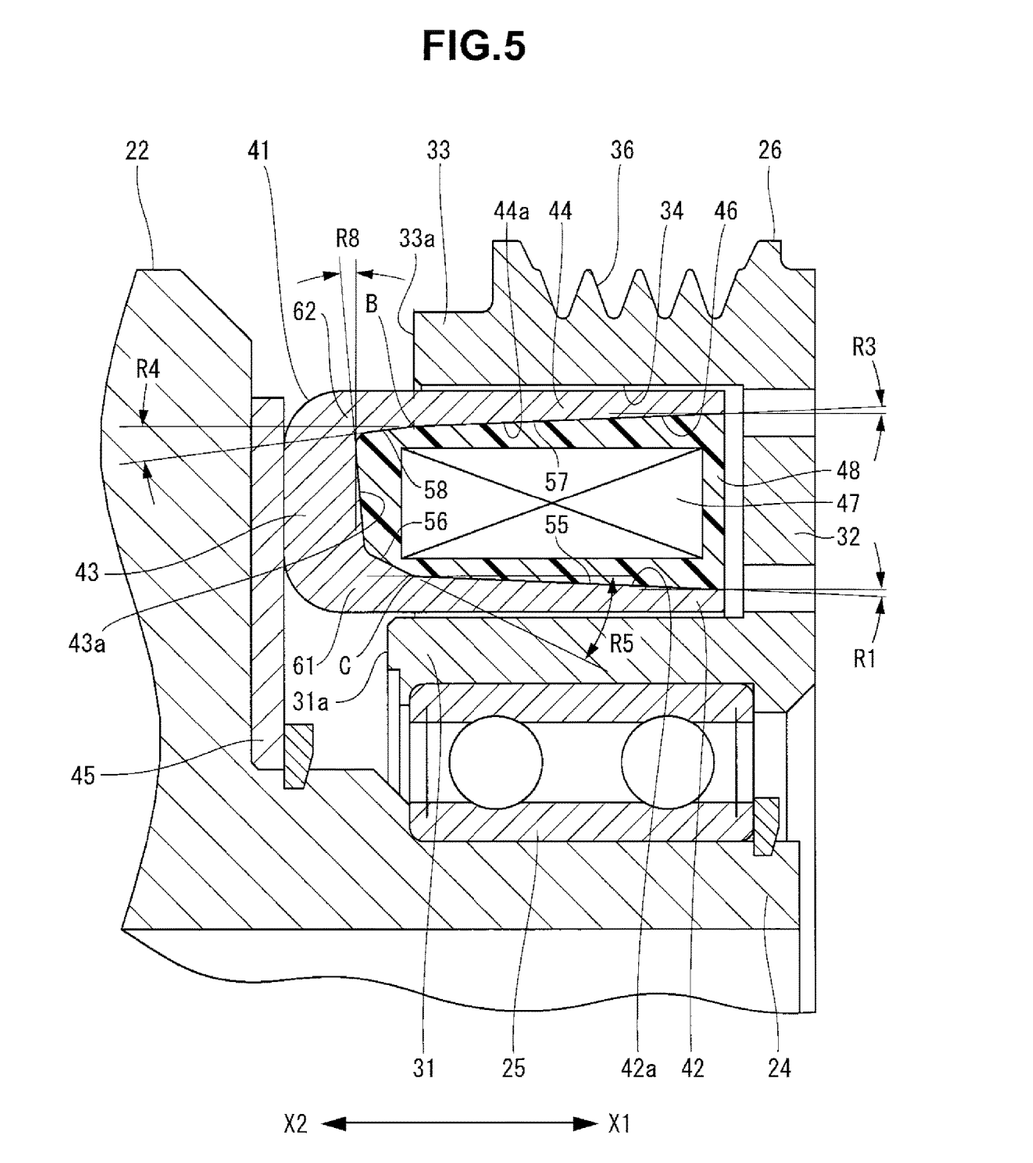
FIG. 5 is a sectional view showing the fourth embodiment of the present invention.

A bottom portion 43 of a field core 41 can be formed as shown in FIG. 5. Members that are the same as or similar to those described with reference to FIGS. 1 to 3 are denoted by the same reference numerals in FIG. 5, and a detailed description thereof will appropriately be omitted. The field core 41 according to this embodiment is different from the field core 41 according to the second embodiment shown in FIG. 3 only in the arrangement of the bottom portion 43, and the rest of the arrangement is the same.

A second tapered surface 56 (first transition surface) of the field core 41 shown in FIG. 5 tilts by an angle R5 with respect to an axis X, and a fourth tapered surface 58 (second transition surface) tilts by an angle R4 with respect to the axis X. A second bending point B and a third bending point C are provided at the same position as an end face 33a of an outer cylindrical portion 33 of a rotor 26 in the axial direction.

In this embodiment, a bottom surface 43a of the bottom portion 43 exposed in a coil storage groove 46 tilts by an angle R8 with respect to a direction orthogonal to the axis X. The direction of tilt is a direction in which outward in the radial direction, the position of the bottom surface 43a gradually moves in a negative axial direction X2. When the bottom surface 43a tilts in this way, the thickness of the bottom portion 43 in the axial direction on the inner side in the radial direction (the side of an inner cylindrical portion 42) becomes larger than the thickness in the axial direction on the outer side in the radial direction (the side of an outer cylindrical portion 44). For this reason, magnetic saturation in bases 9a and 10a (see FIG. 7) of the field core is eliminated. In addition, since the magnetic path sectional area of the bottom portion 43 on the inner side in the radial direction has a value approximate to the magnetic path sectional area on the outer side in the radial direction, and the magnetic resistance in a magnetic circuit Φ becomes low, the magnetic flux permeability between the inner cylindrical portion 42 of the field core 41 and the rotor 26 further rises.

Fifth Embodiment

Figure 6:
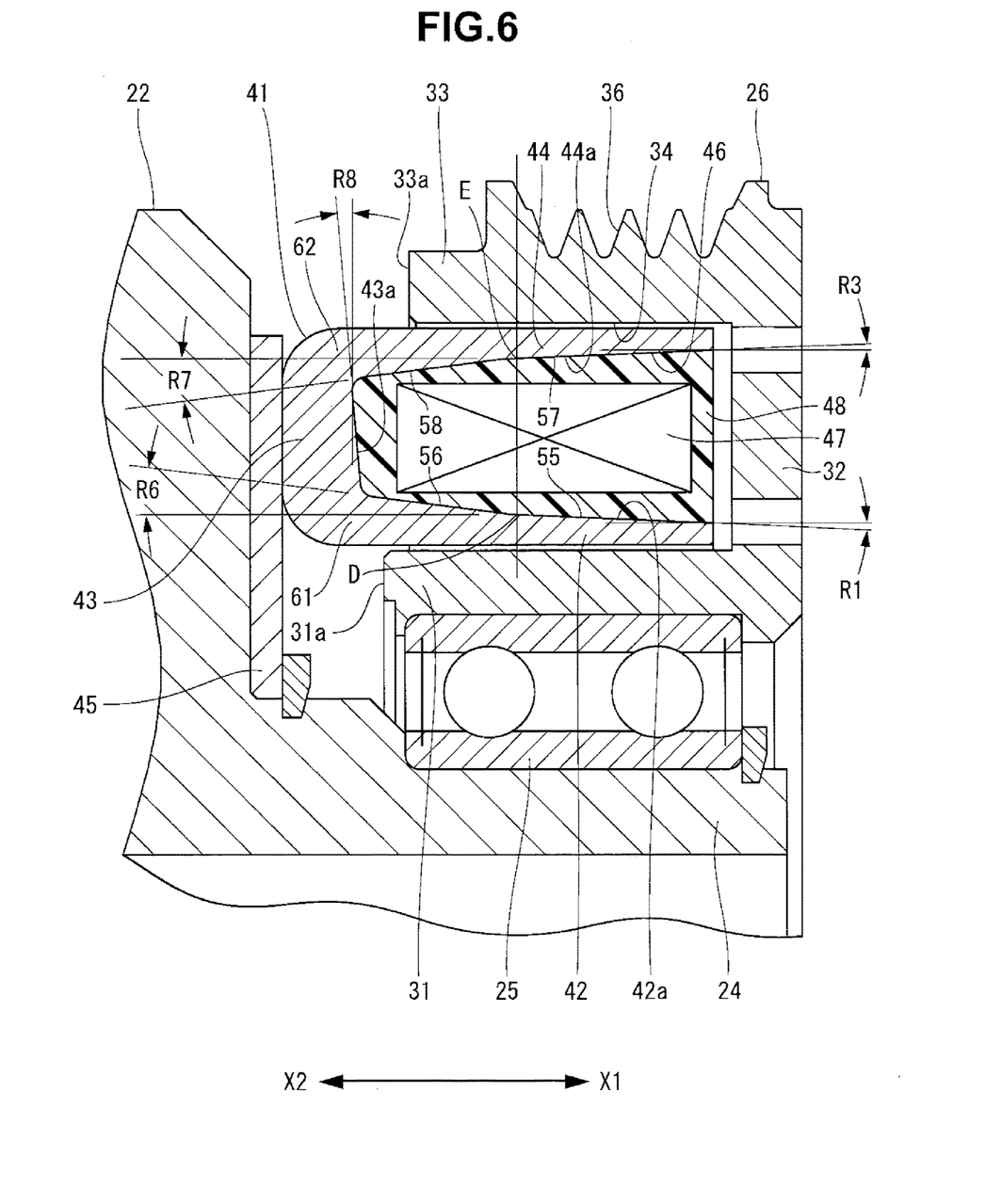
FIG. 6 is a sectional view showing the fifth embodiment of the present invention.

A bottom portion 43 of a field core 41 can be formed as shown in FIG. 6. Members that are the same as or similar to those described with reference to FIGS. 1, 2, and 4 are denoted by the same reference numerals in FIG. 6, and a detailed description thereof will appropriately be omitted. The field core 41 according to this embodiment is different from the field core 41 according to the third embodiment shown in FIG. 4 only in the arrangement of the bottom portion 43, and the rest of the arrangement is the same.

A second tapered surface 56 (first transition surface) of the field core 41 shown in FIG. 6 tilts by an angle R6 with respect to an axis X, and a fourth tapered surface 58 (second transition surface) tilts by an angle R7 with respect to the axis X. A fourth bending point D and a fifth bending point E are provided at positions overlapping the intermediate portion of an inner cylindrical portion 31 of a rotor 26 in the axial direction.

A bottom surface 43a of the bottom portion 43 exposed in a coil storage groove 46 tilts by an angle R8 with respect to a direction orthogonal to the axis X. The direction of tilt is a direction in which outward in the radial direction, the position of the bottom surface 43a gradually moves in a negative axial direction X2. When the bottom surface 43a tilts in this way, the thickness of the bottom portion 43 on the inner side in the radial direction becomes larger than the thickness on the outer side in the radial direction. For this reason, magnetic saturation in bases 9a and 10a (see FIG. 7) of the field core is eliminated. In addition, since the magnetic path sectional area of the bottom portion 43 on the inner side in the radial direction has a value approximate to the magnetic path sectional area on the outer side in the radial direction, and the magnetic resistance in a magnetic circuit Φ becomes low, the magnetic flux permeability between an inner cylindrical portion 42 of the field core 41 and the rotor 26 further rises.

In the above-described embodiments, a case in which the present invention is applied to the electromagnetic clutch 21 mounted on the compressor for a car air conditioner has been described. However, the electromagnetic connecting device according to the present invention is also applicable to, for example, an electromagnetic driving device of a differential device of a vehicle. The electromagnetic driving device employs an arrangement in which a rotor is mounted on the rotating shaft on the driving side so as to be integrally rotatable.

Additionally, in the above-described embodiments, an example in which the bottom surface 43a of the coil storage groove 46 of the field core 41 is provided at a position spaced apart in the negative axial direction X2 from the end face 31a of the inner cylindrical portion 31 of the rotor 26 and the end face 33a of the outer cylindrical portion 33 has been described. However, the electromagnetic connecting device according to the present invention is also applicable to an electromagnetic connecting device configured such that the bottom surface 43a of the coil storage groove 46 of the field core 41 is provided at a position spaced apart in the negative axial direction X2 from at least one of the end face 31a of the inner cylindrical portion 31 of the rotor 26 and the end face 33a of the outer cylindrical portion 33 of the rotor 26.

Furthermore, an example in which the second tapered surface 56 (first transition surface), the fourth tapered surface 58 (second transition surface), and the bottom surface 43a of the field core 41 are linear tilting surfaces has been described. However, these tilting surfaces may be not linear but curved tilting surfaces.

Additionally, the electromagnetic connecting device according to the present invention is also applicable to an electromagnetic connecting device in which the angles R1 and R3 that are the draft angles of the field core 41 are set to zero, and the first and third tapered surfaces 55 and 57 are surfaces parallel to the axis X.

What is claimed is:

1. An electromagnetic connecting device comprising:
    an electromagnetic coil;
    a field core including a first inner cylinder, a first outer cylinder, a bottom that connects an edge of the first inner cylinder and an edge of the first outer cylinder, and a coil storage groove that stores the electromagnetic coil;
    a rotor including a second inner cylinder, a second outer cylinder, a disc that connects an edge of the second inner cylinder and an edge of the second outer cylinder, and a core storage groove that stores the field core inserted from a side of an opening of the coil storage groove; and
    an armature facing the disc of the rotor,
    wherein the bottom of the field core wholly projects to an outside of the core storage groove,
    an outer peripheral surface of the first inner cylinder and an inner peripheral surface of the first outer cylinder include a first transition surface and a second transition surface, respectively, on a side of the bottom,
    each of the first transition surface and the second transition surface includes a tilting surface that gradually narrows a groove width of the coil storage groove along with an increase in a distance from the side of the opening of the coil storage groove,
    wherein the outer peripheral surface of the first inner cylinder includes a first tapered surface extending from an opening edge of the coil storage groove toward the bottom, and a second tapered surface that forms the first transition surface,
    the inner peripheral surface of the first outer cylinder includes a third tapered surface extending from the opening edge of the coil storage groove toward the bottom, and a fourth tapered surface that forms the second transition surface, and
    tilt angles of the second tapered surface and the fourth tapered surface with respect to an axis are larger than tilt angles of the first tapered surface and the third tapered surface with respect to the axis, respectively.

2. The device according to claim 1, wherein a first bending point that is a connecting point between the first tapered surface and the second tapered surface is provided at one of the same position as an end face of the second inner cylinder of the rotor in an axial direction and a position on the side of the opening of the coil storage groove spaced apart from the end face.

3. The device according to claim 1, wherein a second bending point that is a connecting point between the third tapered surface and the fourth tapered surface is provided at one of the same position as an end face of the second outer cylinder of the rotor in an axial direction and a position on the side of the opening of the coil storage groove spaced apart from the end face.

4. The device according to claim 1, wherein the tilt angle of the second tapered surface with respect to the axis is larger than the tilt angle of the fourth tapered surface with respect to the axis.

5. The device according to claim 1, wherein a thickness of the bottom on a side of the first inner cylinder is larger than a thickness of the bottom on a side of the first outer cylinder.

6. The device according to claim 1, wherein the electromagnetic coil is made of an aluminum wire.

* * * * *